United States Patent [19]

Levine et al.

[11] 4,101,445
[45] Jul. 18, 1978

[54] PREPARATION OF MODIFIED AND ACTIVATED CHROMOCENE CATALYSTS FOR ETHYLENE POLYMERIZATION

[75] Inventors: Isaac Jacob Levine, Somerville; Frederick John Karol, Belle Mead, both of N.J.

[73] Assignee: Union Carbide Corporation, New York, N.Y.

[21] Appl. No.: 725,542

[22] Filed: Sep. 22, 1976

[51] Int. Cl.$^2$ ............................ C08F 4/76; C08F 4/78
[52] U.S. Cl. .............................. 252/429 R; 252/430; 252/431 R; 526/107; 526/170
[58] Field of Search ............... 252/428, 429 R, 431 R, 252/430

[56] References Cited

U.S. PATENT DOCUMENTS

| 3,622,521 | 11/1971 | Hogan et al. | 252/430 |
| 3,709,853 | 1/1973 | Karapinka | 260/683.15 D X |
| 3,879,362 | 4/1975 | Chalfont et al. | 252/431 R X |
| 3,879,368 | 4/1975 | Johnson | 252/431 R X |

Primary Examiner—Patrick P. Garvin
Attorney, Agent, or Firm—Bernard Francis Crowe

[57] ABSTRACT

Ethylene polymerization catalysts are prepared by depositing a chromocene compound on a support with a titanium compound and activating the final blend at 300° C. to about 1000° C. A fluoriding agent can be optionally added where a narrower molecular weight distribution of the polyethylene to be obtained is desired. Catalysts with good reproducibility, when prepared by this method, show particular utility in production of polyethylene by a fluid bed process.

9 Claims, No Drawings

PREPARATION OF MODIFIED AND ACTIVATED CHROMOCENE CATALYSTS FOR ETHYLENE POLYMERIZATION

BACKGROUND OF THE INVENTION

This invention pertains to ethylene homopolymerization and copolymerization catalysts and more particularly to a method for preparing supported chromium polymerization catalysts.

Ethylene polymerization catalysts containing chromium and titanium are old in the art. These catalysts were an improvement over prior catalysts containing chromium alone in that they afforded lower molecular weight ethylene polymers which can be processed more easily than higher molecular weight polyethylenes. In particular several patents have described specific methods for producing titanium modified chromium catalysts for ethylene polymerization. U.S. Pat. No. 3,349,067 discloses a process of preparing a polymerization catalyst which comprises contacting a carrier material with a solution of chromium-containing compound in anhydrous organic solvent. In this disclosure the specifications describe reaction in the presence of silica of chromyl chloride ($CrO_2Cl_2$) and tetra (n-butyl) titanate to form a precipitate, containing titanium and chromium, on the silica support. Such a process therefore depends on the reaction product of chromyl chloride and the organic titanate to deposit, in no unique way, on the substrate.

U.S. Pat. No. 3,622,521 describes a catalyst formed by first adding to a support a chromium-containing compound using an aqueous medium and then adding a titanium-containing compound using a non-aqueous medium. Such a process involves the use of two different solvents involving two separate and distinct deposition steps. Such a process can be cumbersome and lead to non-reproducible catalysts for ethylene polymerization.

U.S. Pat. No. 3,879,362 deals with a process for polymerizing ethylene using a catalyst prepared by (1) heating together a titanium compound and a support material selected from silica, alumina, zirconia, thoria or composites thereof and (2) heating the product from (1) with a chromium compound at a temperature in the range 350°–550° C. to produce an active catalyst. A number of chromium compounds is cited in the specifications including bis(cyclopentadienyl) chromium, i.e., chromocene. The main attention is devoted to this two step process involving either chromium oxide or tertiary butyl chromate as the source of the chromium compound.

All of the above cited routes for preparation of these modified catalysts can cause problems. The catalysts are sensitive to the methods of preparation thereby producing polyethylenes which vary in polymer properties such as molecular weight, molecular weight distribution, and density. Catalyst activity also varies depending on the method of catalyst preparation.

It is therefore an object of this invention to provide a catalyst for ethylene polymerization which is simple to prepare and which exhibits consistent catalytic activity.

Other objects will be apparent to those skilled in the art upon a reading of the specification.

SUMMARY OF THE INVENTION

A method for preparing a catalyst for the consistent polymerization of ethylene is provided by the steps of:

(1) Drying an inorganic oxide catalyst support, having a high surface area, selected from the group consisting of alumina, thoria, silica, zirconia and mixtures thereof at a temperature of about 100° C. to about 800° C.;

(2) Slurrying the dried support obtained in step (1) with a substantially anhydrous normally liquid hydrocarbon;

(3) Blending the slurry obtained in step (2) with a solution of a chromocene compound in a normally liquid hydrocarbon and a titanium compound which is soluble in said hydrocarbon and is calcinable to $TiO_2$ whereby the resultant blend, exclusive of hydrocarbon, contains about 0.2 to about 3.0 weight % of elemental chromium and about 1.0 to about 10 weight % of elemental titanium;

(4) Removing the hydrocarbon leaving a solid residue;

(5) Adding to the residue from step (4) from 0 to about 2.5 weight % of a fluoridation agent calculated as F; and (6) Heating the product from step (5) in a substantially anhydrous oxygen-containing atmosphere at a temperature of about 300° C. to about 1000° C. until an active ethylene polymerization catalyst is obtained.

For the purposes of this invention chromocene compounds, also referred to as bis(cyclopentadienyl) chromium (II) compounds, have the structure:

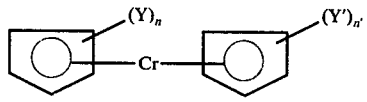

wherein each of Y and Y' is a hydrocarbon radical having 1 to about 20 carbon atoms and each $n$ and $n'$ has a value of 0 to 5.

While the blend of chromocene compound and support in step (3) can contain from 0.02 to about 3% by weight of chromium, it is preferred to use blends containing about 0.1 to about 1.0% by weight of chromium.

The titanium compounds which may be used include all those which are calcinable to $TiO_2$ under the activation conditions employed, and include those disclosed in U.S. Pat. No. 3,622,521 incorporated herein by reference. These compounds include those having the structures

wherein $m$ is 1, 2, 3 or 4; $n''$ is 0, 1, 2 or 3 $m + n'' = 4$, where R is a $C_1$ to $C_{12}$ alkyl, aryl or cycloalkyl group, and combinations thereof, such as aralkyl, alkaryl, and the like;

R' is R, cyclopentadienyl, and $C_2$ to $C_{12}$ alkenyl groups, such as ethenyl, propenyl, isopropenyl, butenyl, and the like; and

where X, a halogen atom, is fluorine, chlorine, bromine or iodine.

The titanium compounds would thus include titanium tetrachloride, tetraisopropyl titanate and tetrabutyl titanate. The titanium compounds are more conveniently deposited on the support from a hydrocarbon solvent solution thereof.

In the case of the organic titanates there is no apparent interaction between the titanium compound and chromocene. Deposition of both the titanium and chromium compounds is believed to occur by direct reaction with the substrate to provide chemically-anchored titanium and chromium species. Such a route to the supported catalysts allows maximum efficency of the titanium and chromium compounds and permits much better control of the catalyst preparation than the method described in U.S. Pat. No. 3,349,067.

The titanium (as Ti) is present in the catalyst, with respect to the Cr (as Cr), in a mol ratio of about 0.5 to 180, and preferably of about 4 to 35.

While the blend in step (3) can contain from about 1.0% to about 10% by weight of titanium, it is preferred to prepare a blend containing about 3% to about 7% of titanium based on the weight of the dried mixture.

It is not necessary to include a fluoridation agent. However, fluoriding has the advantage of affording a narrower molecular weight distribution and better copolymerization of $\alpha$-olefins. While up to about 5% by weight of fluoridation agent can be used, it is preferred that about 0.05 to 1.0% by weight calculated as F be used.

The fluorine compounds which may be used include HF, or any compound of fluorine which will yield HF under the activation conditions employed. These compounds include ammonium hexafluorophosphate, ammonium hexafluorosilicate, ammonium tetrafluoroborate, and ammonium hexafluorotitanate. The fluorine compounds are conveniently deposited on the support from an aqueous solution thereof, or by dry blending the solid fluorine compounds with the other components of the catalyst prior to activation.

The inorganic oxide materials which may be used as a support in the catalyst compositions of the present invention are porous materials having a high surface area, that is, a surface area in the range of about 50 to about 1000 square meters per gram, and a particle size of about 50 to 200 microns. The inorganic oxides which may be used include silica, alumina, thoria, zirconia and other comparable inorganic oxides, as well as such oxides.

The normally liquid hydrocarbons can be $C_5$–$C_{10}$ aliphatic or $C_6$–$C_{10}$ aromatic. Preferred are isopentane, hexane, benzene, toluene, xylene and the like.

The support should be dried before it is brought into contact with chromocene and titanium compounds. This is normally done by simply heating or predrying the catalyst support with a dry inert gas or dry air prior to use. It has been found that the temperature of drying has an appreciable effect on the molecular weight distribution and the melt index of the polymer produced. The preferred drying temperature is about 100° to about 300° C. with temperatures of about 120° to about 250° C. being even more preferred.

Activation of the catalyst can be accomplished at nearly any temperature up to about its sintering temperature. The passage of a stream of dry air or oxygen through the supported catalyst during the activation aids in the displacement of the water from the support. Activation temperatures of from about 300° C. to 900° C. for a short period of about 6 hours or so is sufficient if well dried air or oxygen is used, and the temperature is not permitted to get so high as to cause sintering of the support. A preferred activation temperature is about 300° C. to about 800° C.

Any grade of support can be used but microspheroidal intermediate density (MSID) silica having a surface area of 300 square meters per gram, and a pore diameter of about 200 Å, and an average particle size of about 70 microns (∼0.0028 inches) (*W. R. Grace's G-952* grade), and intermediate density (ID) silica having a surface area of about 300 square meters per gram, a pore diameter of about 160 Å and an average particle size of about 103 microns (∼0.0040 inches) (W. R. Grace's G-56 grade) are preferred. When ethylene polymers of higher melt index are desired it is preferred to use silicas having pore volume of about 2.5 cc/g. and a surface area of about 400 m²/g.

The invention is further described in the Examples which follow. All parts and percentages are by weight unless otherwise specified.

EXAMPLE 1

CATALYST PREPARATION

A G-952-200 grade of microspheroidal intermediate density silica obtained from W. R. Grace and Co. having a surface area of about 300 square meters per gram and a pore diameter of about 200 angstroms was dried at 200° C. for 8 hours. The dried silica (481 grams) was stirred with a dry solution of isopentane containing 5.3 grams of unsubstituted bis(cyclopentadienyl)chromium II (chromocene) and 168 grams of tetraisopropyl titanate. The isopentane was removed by evaporation leaving a dry residue consisting of 1.1% by weight of chromocene and 35% by weight of tetraisopropyl titanate codeposited on the silica support. The residue was activated by heating for 2 hours in under nitrogen at 150° C., and then 2 hours at 300° C. The nitrogen atmosphere was replaced by air and heating continued at 300° C. for 2 hours. Finally the temperature was raised to 800° C. and kept there for 8 hours.

EXAMPLE 2

CATALYST PREPARATION

The procedure described in Example 1 was followed with the following differences:

(1) The amount of silica used was 400 grams;

(2) The amount of bis(cyclopentadienyl) chromium II used was 4.4 grams;

(3) The amount of tetraisopropyl titanate used was 140 grams; and (4) The residue prior to activation was treated with 1.2 grams of ammonium hexafluorosilicate to effect a deposition of 0.3 weight % on the silica support.

EXAMPLE 3

CATALYST EVALUATION

The catalyst prepared in Example 1 was evaluated in a 14 inches diameter fluid bed reactor (similar to that described in United Kingdom Pat. No. 1,253,063 which is incorporated herein by reference) at 84° C. and 300 psig reactor pressure with a butene/ethylene mixture present in a ratio of 0.083. The catalyst productivity was 5.3 grams/ (gram of Cr × $10^{-6}$). The ethylene/butene copolymer product had a density (ASTM D-1505) of 0.914 g./cc. and a melt index (ASTM D-1238) of 0.87 dg/min.

EXAMPLE 4

CATALYST EVALUATION

The procedure used in Example 3 was used to evaluate the catalyst prepared in Example 2 with the exception that the butene/ethylene ratio was 0.084. The catalyst productivity was 4.9 grams (gram of Cr × $10^{-6}$). The ethylene/butene copolymer product had a density of 0.920 g./cc. and a melt index of 0.17 dg./min.

EXAMPLE 5

CATALYST PREPARATION

The procedure described in Example 3 was modified in that 7 ml. of a toluene solution containing 0.35 grams of bis(cyclopentadienyl)chromium II was added to a n-pentane slurry of 19.8 grams of 952 silica which had been dried at 200° C. and stirred under nitrogen for 1 hour after which time 6.0 grams of tetraisopropyl titanate was added. The pentane and toluene were evaporated off and the residue activated by heating oxygen at 330° C. for 2 hours and at 720° C. for 17 hours.

EXAMPLE 6

CATALYST PREPARATION

A mixture of 18.6 grams of 952 silica dried at 200° C. and 0.34 grams of bis(cyclopentadienyl) chromium II was stirred in n-pentane for 1 hour after which time 5.6 grams of tetraisopropyl titanate was added. The n-pentane was evaporated and the residue mixed with 0.19 grams of ammonium hexafluorosilicate. The residue was activated by heating in oxygen for 4 hours at 330° C. and for 17 hours at 780° C.

EXAMPLE 7

CATALYST EVALUATION

A stirred high pressure reaction vessel, having a void of 1000 ml., was charged with 0.43 grams of the catalyst prepared in Example 5 and 40 ml. of 1-hexane. The vessel was sealed and pressurized with ethylene to a pressure of 200 psig. Polymerization was allowed to proceed at 86° C. for 12 minutes. A yield of 78 grams of ethylene polymer was obtained having a melt index of 147 dg./min. and a density of 0.922 g./cc.

In a second run which deviated from the above-described procedure only in that 0.31 grams of catalyst was used and the polymerization time was 15 minutes, a yield of ethylene polymer of 86 grams was obtained having a melt index of 166 dg./min. and a density of 0.917 g./cc.

EXAMPLE 8

CATALYST EVALUATION

Example 7 was repeated in duplicate using 0.35 grams and 0.32 grams respectively of the catalyst prepared in Example 6, and polymerization times of 30 and 20 minutes respectively. The ethylene polymer products were obtained in yields of 120 grams and 56 grams. The melt indexes were 0.32 dg./min. and 0.64 dg./min. respectively. The densities were 0.918 g./cc. and 0.917 g./cc. respectively.

Although the invention has been described in its preferred form with a certain degree of particularity, it is understood that the present disclosure has been made only by way of example and that numerous changes can be made without departing from the spirit and scope of the invention.

What is claimed is:

1. A method for preparing a catalyst for the consistent polymerization of ethylene which comprises the steps of:
   (1) drying an inorganic oxide catalyst support, having a high surface area, selected from the group consisting of a alumina, thoria, silica, zirconia, and mixtures thereof at a temperature of about 100° C. to about 800° C.;
   (2) slurrying the dried support obtained in step (1) with a substantially anhydrous normally liquid hydrocarbon;
   (3) blending the slurry obtained in step (2) with a solution of a chromocene compound having the formula:

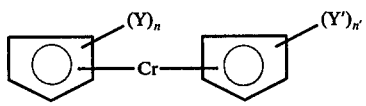

wherein each of Y and Y' is a hydrocarbon radical having 1 to about 20 carbon atoms and each $n$ and $n'$ has a value of 0 to 5, in a normally liquid hydrocarbon and a titanium compound which is soluble in said hydrocarbon and is calcinable to $TiO_2$ whereby the resultant blend, exclusive of hydrocarbon, contains about 0.02 to about 3.0 weight % of elemental chromium and about 1.0 to about 10 weight % of elemental titanium;
   (4) removing the hydrocarbon leaving a solid residue;
   (5) adding to the residue from step (4) from 0 to about 2.5 weight % of a fluoridation agent calculated as F; and
   (6) heating the product from step (5) in a substantially anhydrous oxygen-containing atmosphere at a temperature of about 300° C. to about 1000° C. until an active ethylene polymerization catalyst is obtained.

2. Method claimed in claim 1 wherein the inorganic oxide catalyst support is silica.

3. Method claimed in claim 1 wherein the chromocene compound is bis(cyclopentadienyl)chromium II.

4. Method claimed in claim 1 wherein the titanium compound has the formula

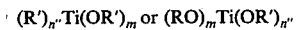

wherein $m$ has values of 1 to 4 inclusive, $n''$ has values of 0 to 3 inclusive, $m + n'' = 4$, R is a $C_1$ to $C_{12}$ alkyl, aryl or cycloalkyl group, and R' is R, cyclopentadienyl or $C_2$ to $C_{12}$ alkenyl groups.

5. Method claimed in claim 1 wherein the titanium compound has the formula $TiX_4$ wherein X is a halogen atom.

6. Method claimed in claim 1 wherein about 0.05 to 1.0% by weight of a fluoridation agent is used.

7. Method claimed in claim 6 wherein the fluoridation agent is $(NH_4)_2 SiF_6$.

8. Method claimed in claim 1 wherein the blend from step 5 is heated in step 6 at a temperature of about 300° C. to about 800° C.

9. Method claimed in claim 1 wherein the hydrocarbon is isopentane.

* * * * *